United States Patent [19]

Liberto et al.

[11] 3,955,018

[45] May 4, 1976

[54] METHOD FOR FORMING A DECORATIVE COATED POROUS MASS AND THE ARTICLE PRODUCED THEREBY

[75] Inventors: Nicholas Liberto; Charles Liberto, both of Baltimore, Md.

[73] Assignee: Aqualine Products, Inc., Baltimore, Md.

[22] Filed: July 22, 1974

[21] Appl. No.: 490,236

[52] U.S. Cl. .................... 428/16; 427/4; 427/385; 428/310

[51] Int. Cl.$^2$ .................... A01N 1/00

[58] Field of Search .......... 117/3, 54, 123 C, 123 D; 8/3, 8; 161/19, 159; 260/42.21; 427/4, 385; 428/17, 310, 16

[56] References Cited

UNITED STATES PATENTS

| | | | |
|---|---|---|---|
| 2,056,166 | 10/1936 | Cohn | 8/3 |
| 2,744,030 | 5/1956 | Toms et al. | 117/3 |
| 2,879,266 | 3/1959 | Anderson | 260/42.21 |
| 3,092,836 | 6/1963 | Boggus | 117/123 |
| 3,130,099 | 4/1964 | Homburger | 117/3 |
| 3,403,200 | 9/1968 | Randall | 260/42.21 |
| 3,413,249 | 11/1968 | Luftglass et al. | 260/42.21 |
| 3,441,362 | 4/1969 | Streck | 8/8 |
| 3,567,496 | 3/1971 | Steinberg et al. | 117/123 |
| 3,632,288 | 1/1972 | Niechwiadowicz et al. | 260/42.21 |
| 3,677,982 | 7/1972 | Marx | 117/98 |

*Primary Examiner*—Ronald H. Smith
*Assistant Examiner*—Sadie L. Childs
*Attorney, Agent, or Firm*—Laff, Whitesel & Rockman

[57] ABSTRACT

A method of providing a safe, decorative coating for a porous decorative mass, such as a coral piece adapted to be used as an ornament in an aquarium. In the preferred embodiment, bleached coral, real or artificial, is coated with a solution prepared from acetone, toluene, polystyrene granules, and a non-water soluble dye. Besides coloring the coral, the coating seals the pores of the coral and prevents increases in the alkaline content of the aquarium water thereby rendering the water safe for tropical fish.

16 Claims, No Drawings

METHOD FOR FORMING A DECORATIVE COATED POROUS MASS AND THE ARTICLE PRODUCED THEREBY

BACKGROUND OF THE INVENTION

FIELD OF THE INVENTION

The present invention relates to a method providing decorative and safe ornamental pieces, such as are adapted to be used in aquariums containing tropical or other fish. In particular, the invention relates to a method for providing brightly colored pieces of natural or artificial coral for use in aquariums.

The number of collectors and fanciers of tropical and other fish has increased radically in recent years, such that providing aquariums and aquarium supplies for fish collectors has become a substantial business enterprise. Aquariums are used today in homes, offices, showrooms, and the like to enhance the decor of the surroundings. Aquariums are usually provided with lights, and decorative pieces of ceramic, fern, floral arrangements, and other objects are added to the tank to present a reálistic tableau of an undersea landscape.

One such decorative element used to enhance the decor of an aquarium comprises a piece or pieces of coral, which once were living organisms growing on reefs in the ocean. The coral is removed from its reef, at which point it dies, and then divided into quantities of a size sufficient to be used in aquariums. However, in the past, no safe, reliable means or method was known to color the coral. It was merely bleached to make it white, and inserted into an aquarium. This has not proved satisfactory, however, since natural coral will alkalize a fresh water tank, thereby increasing the pH factor and make the tank unsafe for tropical fish.

SUMMARY AND OBJECTS OF THE INVENTION

Therefore, it is a primary object of a preferred embodiment of the present invention to provide a decorative porous mass, such as a coral piece which is made from natural or artificial coral, and which will not increase the alkaline content of an aquarium in which the mass is placed.

An additional object of the invention is to provide a decorative coral piece for use in aquariums, which coral piece comprises a permanent, vivid, uniform coating of a selected color.

Yet another object of the invention is to provide a decorative porous mass having a coating of a selected color, which coating hermetically seals the pores of the mass, thereby making it safe for use in fresh and salt water aquariums.

A further object of the invention is to provide a decorative coral piece for use in aquariums and other environments whereby a colored coating is applied to the surface of the coral, and the coating is absorbed into the surface of the coral.

Yet another object of the present invention is to provide a method of producing a decorative porous mass having a permanent color coating of plastic applied to the surface thereof.

These and other features and advantages of the present invention will become apparent from consideration of the following specification.

DESCRIPTION OF THE PREFERRED EMBODIMENT

To make a decorative porous mass, such as natural coral, in accordance with a preferred embodiment of my invention, a segment of natural coral, which is no longer a living organism, is completely dried out, cleaned, and preferably bleached until it reaches its natural white color. Next, the coating comprising the color and sealant is prepared. First, a solvent mix of 50% acetone and 50% toluene by volume is blended in a tank or other suitable container. For purposes of illustration, it is assumed that one gallon of solvent mix is blended, although the quantity of solvent mix may be varied in accordance with the quantity and size of coral to be coated.

To 1 gallon of solvent mix, 2 pounds of unmodified, uninhibited polystrene granules are added, such as sold by Sinclair Koppers under the trademark DYLENE-2. These are 1/8 inch spherical granules similar to the type used in injection mold machines and processes. Polystyrene is used to provide a coating and sealant in the present invention since it is a hard plastic and will not absorb an appreciable amount of water. The polystyrene dissolves in the solvent mix solution, and forms as a jelly mass at the bottom of the solution tank.

Next, the solvent solution and jelly mass of polystyrene is blended by agitation or other means until the polystyrene becomes uniformly dispersed in the solution, thereby forming a liquid plastic blend. Then, an aniline or azo non-water soluble dye of a desired color is added to give the solution a distinctive hue. Aniline dye is used because it is compatible with acetone and toluene. The aniline or azo dyes are noted for their strong, intense color. The dye is blended thoroughly until it is completely dispersed in the solution.

The above steps produce a colored liquid plastic of uniform color and consistency throughout the entire volume of the solution. To apply the solution to the coral, the coral is dipped into the tank containing the solution for a few minutes, or until all trapped air escapes from the coral. The colored plastic replaces the air in the crevices and pockets of the coral as the air escapes. As a result, the surface layers of the coral actually absorb the colored solution.

The coral is next removed from the solution, and the excess plastic is allowed to drip off. The coral dries by air evaporation in a few hours, preferably at ambient or room temperatures (75°–90°) or higher. The acetone and toluene in the solution evaporate readily in air at these temperatures.

As the acetone and toluene evaporate, only a layer of colored plastic is left on the surface of the coral. The layer of plastic completely covers the coral, leaving a uniform coating of colored plastic on the surface thereof. The coral is completely sealed; no holes or crevices are left open.

The coral thus produced is hermetically sealed, making it safe for use as a decorative piece in a fresh water aquarium. Natural, uncoated coral will alkalize a fresh water aquarium, thus increasing the pH of the water in the tank, making it unsafe for tropical fish. By applying the novel plastic coat on the coral, no alkalizing takes place, and the water remains safe for tropical fish.

If desired, the bleached coral may be coated with a clear plastic coat having no dye. To produce a naturally colored coral, the step of adding the aniline dye is omitted from the above described process, and the clear transparent polystyrene coat covers the coral. If the coral is properly bleached, an ornamental piece of stark white coral is produced.

The plastic coat applied in accordance with the present invention penetrates the surface of the coral, preventing the color from being removed by the water in the aquarium. In addition, the above-described plastic coat can also be applied to artificial coral having a porous surface.

While the preferred embodiment of the invention discloses a method of providing a decorative coral piece for use in an aquarium, it is understood that the decorative piece provided by the invention may comprise any porous mass, and may be used in other non-aquatic environments to enhance the decor and beauty of the environment.

It will be obvious to those skilled in the art that many changes and modifications may be made from the above description without departing from the spirit and scope of the invention and accordingly the invention is not to be limited by the following claims.

What is claimed is:

1. A method of coating a porous mass of natural coral or articial coral for use as an ornamental piece comprising the steps of:

preparing a solvent solution;

blending polystyrene plastic granules into said solution and agitating said blend to form a uniform consistency;

adding a non-water soluble aniline base dye of a preselected color to said blend to form a mixture, and agitating said mixture whereby said dye is completely dispersed in said blend;

coating said mass of coral with said mixture; and drying said coated mass of coral.

2. The method of claim 1 including the additional step of bleaching said natural coral prior to coating said coral with said mixture.

3. The method of claim 1 wherein said solvent solution is preared by mixing 50 percent acetone with 50 percent toluene, by volume.

4. The method of claim 1 wherein said polystyrene plastic granules are spherical in configuration.

5. The method of claim 1 wherein said step of drying said coated mass of coral comprises allowing said coated mass of coral to dry by ambient air evaporation.

6. A decorative coating for a porous mass selected from the group consisting of natural coral and artificial coral comprising a blend of liquid polystyrene plastic in a solvent solution and a non-water soluble aniline base dye of a preselected color, said blend being applied to the surface of said porous mass of coral.

7. The decorative coating of claim 6 wherein said solvent solution is 50 percent acetone and 50 percent toluene, by volume.

8. The decorative coating of claim 6 wherein said coating is partially absorbed by said surface of said porous mass of coral when said coating is applied to said coral.

9. A porous coral piece having a coating and sealant on the surface thereof, said coating and sealant comprising a blend of plastic and a non-water soluble dye of a preselected color.

10. The coral piece of claim 9 wherein said plastic is polystyrene.

11. The coral piece of claim 9 wherein said non-water soluble dye is an aniline dye of said preselected color.

12. The coral piece of claim 9 wherein said coating is partially absorbed by said surface of said coral piece.

13. A method of coating a porous mass of natural or artificial coral for use as an ornamental piece comprising the steps of:

preparing a solvent solution;

blending clear polystyrene plastic granules into said solution and agitating said blend to form a uniform consistency;

applying said blend to the surface of said mass of coral; and drying said coated mass of coral.

14. The method of claim 13 including the additional step of bleaching said natural coral prior to coating said coral with said blend.

15. A decorative coating and sealant for a porous mass of natural or articial coral comprising a blend of liquid polystyrene plastic in a solvent solution, said blend being applied to the surface of said porous mass of coral.

16. A porous coral piece having a coating and sealant on the surface thereof, said coating and sealant comprising a layer of transparent plastic material.

* * * * *